(12) United States Patent  
Nyland

(10) Patent No.: US 8,307,579 B2
(45) Date of Patent: Nov. 13, 2012

(54) ARM SUPPORT FOR USE WITH A FISHING ROD

(76) Inventor: Thomas John Nyland, Eagan, MN (US)

( * ) Notice: Subject to any disclaimer, the term of this patent is extended or adjusted under 35 U.S.C. 154(b) by 1956 days.

(21) Appl. No.: 10/848,829

(22) Filed: May 19, 2004

(65) Prior Publication Data

US 2005/0257416 A1    Nov. 24, 2005

(51) Int. Cl.
   *A01K 97/10*    (2006.01)
(52) U.S. Cl. .............................. 43/21.2; 43/25
(58) Field of Classification Search ............... 43/21.2, 43/25
   See application file for complete search history.

(56) References Cited

U.S. PATENT DOCUMENTS

| | | | |
|---|---|---|---|
| 2,146,350 A * | 2/1939 | Roberts | 224/200 |
| 2,158,104 A | 5/1939 | Bowen | |
| 2,244,408 A | 6/1941 | Thompson | |
| 2,869,276 A * | 1/1959 | Hagen | 43/25 |
| 3,159,939 A * | 12/1964 | Transeau | 43/21.2 |
| 3,367,056 A * | 2/1968 | Johnson | 43/25 |
| 3,372,510 A | 3/1968 | Arsenault | |
| 4,014,129 A | 3/1977 | Capra | |
| 4,190,977 A | 3/1980 | Casper | |
| 5,159,775 A | 11/1992 | Sutula, Jr. | |
| 5,212,900 A * | 5/1993 | Perry | 43/21.2 |
| 5,313,735 A * | 5/1994 | Latouche | 43/25 |
| 5,390,438 A | 2/1995 | Warren, Jr. | |
| 5,941,012 A * | 8/1999 | Dominguez | 43/21.2 |
| 6,065,240 A * | 5/2000 | Paddock | 43/21.2 |
| 6,295,755 B1 * | 10/2001 | Macaluso | 43/25 |
| 6,493,982 B1 | 12/2002 | Macaluso | |

* cited by examiner

*Primary Examiner* — Darren W Ark
(74) *Attorney, Agent, or Firm* — Merchant & Gould P.C.

(57) ABSTRACT

An arm support for use with an elongated object such as a fishing rod is disclosed herein. The arm support device includes an arm cradle that mounts above the handle of the elongated object. The arm cradle can be pivoted relative to the handle about a pivot axis that is offset to either the left or right side of the handle.

8 Claims, 4 Drawing Sheets

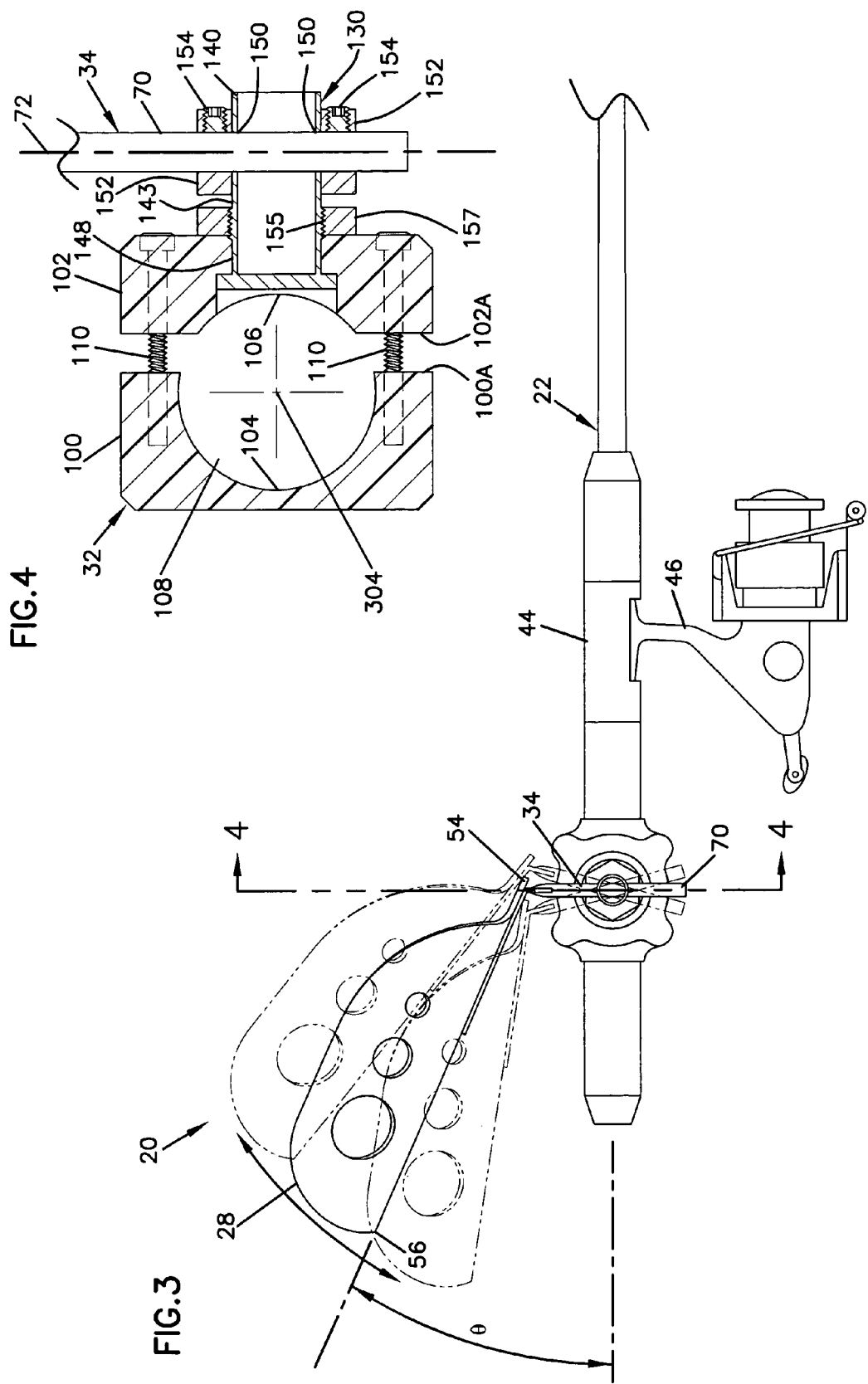

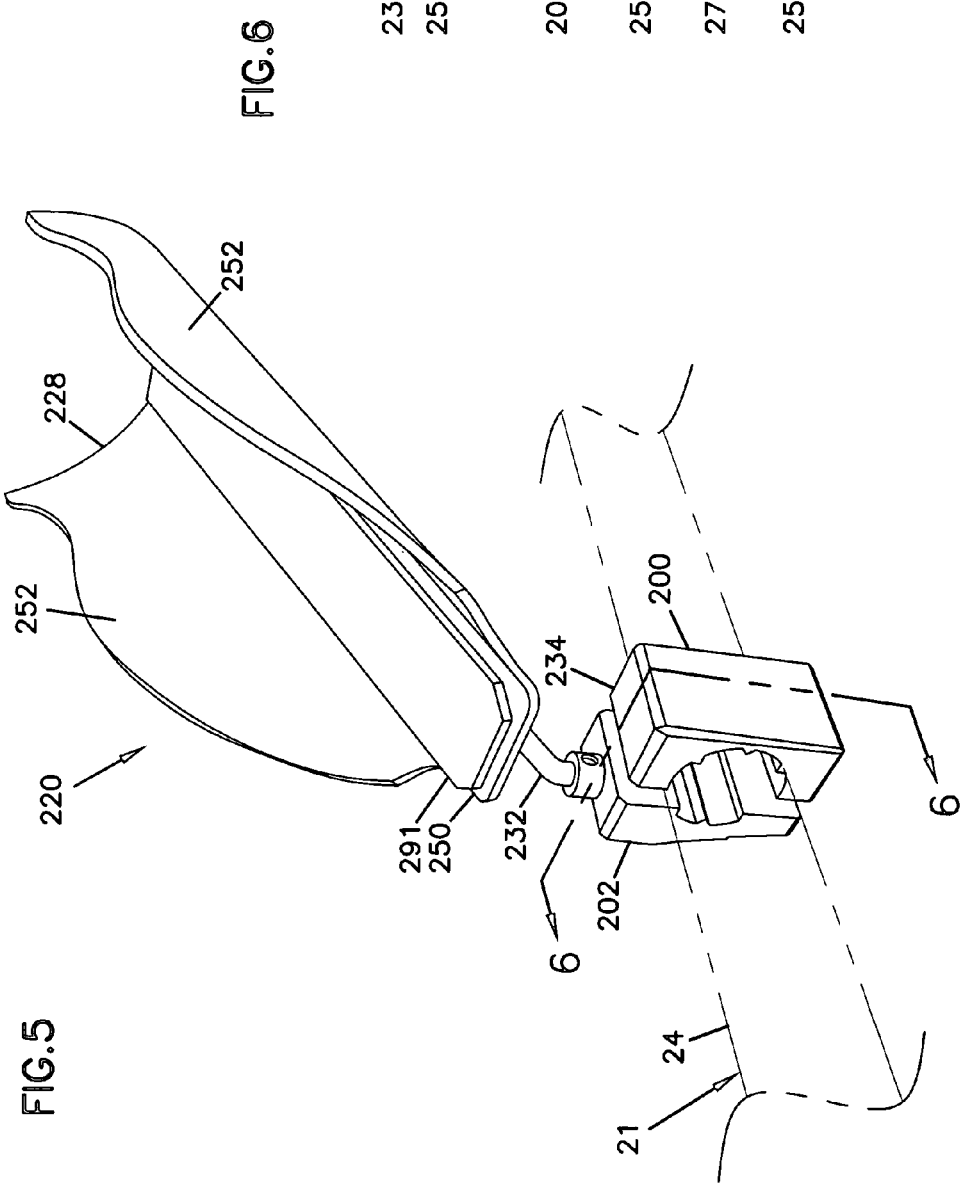

ARM SUPPORT FOR USE WITH A FISHING ROD

TECHNICAL FIELD

The principles disclosed herein relate to fishing equipment. More particularly, the disclosure relates to arm support devices for use with fishing rods.

BACKGROUND

Fishing has become increasingly popular at both the professional and recreational level. Fishing success at all levels can be hampered by an angler's inability to effectively handle a fishing rod. For example, improper technique and rod control can lead to poor casting accuracy and poor hook setting. Also, the inability to maintain the rod tip at a high location while playing a fish can lead to lost fish. Moreover, many anglers experience tired wrists after extended periods of fishing because traditional fishing rods provide relatively low amounts of leverage.

SUMMARY

One inventive aspect of the disclosure relates to an arm support device for use with a fishing rod that increases an angler's leverage while being comfortable and easy to use.

Another inventive aspect of the disclosure relates to an arm support device for use with a fishing rod that is laterally moveable to enhance comfort and ease of use.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts underlying the embodiments disclosed herein.

BRIEF DESCRIPTION OF THE DRAWINGS

FIG. 3 is a side view of the arm support device and fishing rod of FIG. 1;

FIG. 4 is a cross-sectional view taken along section line 4-4 of FIG. 3;

FIG. 5 is a perspective view of an alternative rod support device having features that are examples of inventive aspects in accordance with the principles of the present disclosure; and FIG. 6 is a cross-sectional view taken along section line 6-6 of FIG. 5.

DETAILED DESCRIPTION

Figure 1:
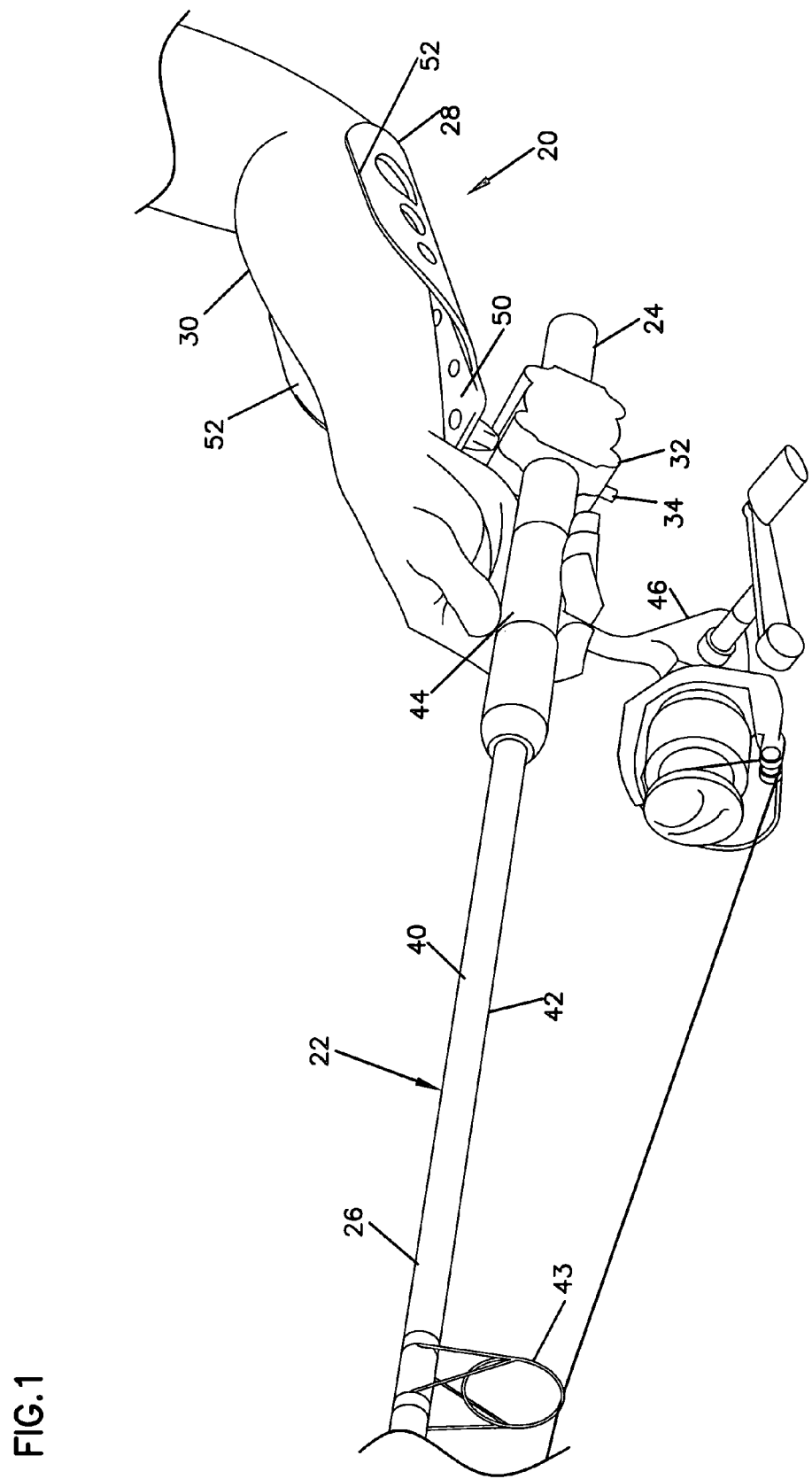
FIG. 1 is a perspective view of an arm support device having features that are examples of inventive aspects in accordance with the principles of the present disclosure, the arm support device is shown in combination with a fishing rod.

FIG. 1 illustrates an arm support device 20 having features that are examples of inventive aspects in accordance with the principles of the present disclosure. The arm support device 20 is shown in combination with a fishing rod 22 including a handle 24 and a shaft 26. The arm support device 20 includes an arm cradle 28 adapted for supporting a forearm 30 of an angler as the angler grasps the handle 24 of the fishing rod 22.

The arm support device 20 also includes a clamp 32 fastened to the handle 24, and a pivot pin 34 that pivotally connects the arm cradle 28 to the clamp 32. The configuration of the arm support device greatly improves the angler's leverage when the angler is playing a fish and setting the hook. Furthermore, the pivot pin 34 allows the cradle 28 to be easily positioned to the particular angle of comfort desired by the angler, and/or to freely pivot with the angler's forearm 30 as his or her wrist bends.

Referring still to FIG. 1, the fishing rod 22 is depicted as a conventional spinning rod having a top side 40 and a bottom side 42. The spinning rod includes eyelets 43 positioned at the bottom side 42 of the rod 22. The fishing rod 22 also includes a reel mount 44 positioned at the handle 24 for mounting a spinning reel 46 beneath the bottom side 42 of the rod 22. While the arm support device 20 has been shown with a conventional spinning rod, it will be appreciated that the arm support device 20 could also be used with other types of fishing rods such as bait casting or spin casting rods. Bait casting and spin casting rods typically have reels and eyelets mounted on the top sides of the rods. It will also be appreciated that, while a preferred use for the arm support device 20 is with respect to fishing rods, the device can also be used to improve leverage with respect to any type of elongated device having a handle where improved leverage and control of the device is desirable.

Figure 2:
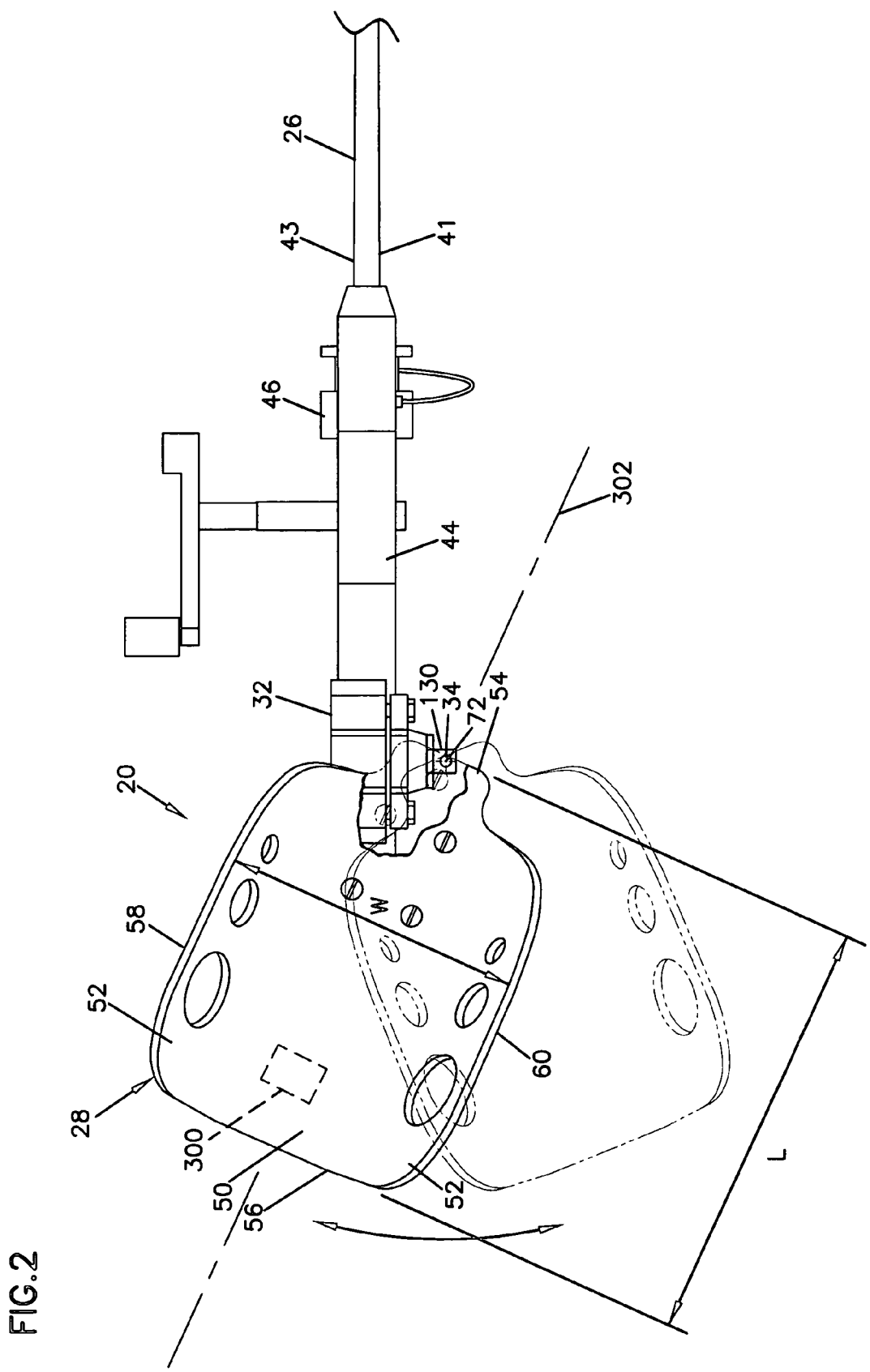
FIG. 2 is a top view of the arm support device and fishing rod of FIG. 1.

As shown in FIGS. 1-3, the arm cradle 28 of the arm support device 20 preferably mounts above the top side 40 of the fishing rod 22 at a location rearward of the reel mount 44. When connected to the rod 22, the arm cradle 28 preferably opens in an upwardly direction such that the angler's forearm can easily be inserted downwardly therein with minimal difficulty. In certain embodiments, a strap (e.g., a Velcro strap or a strap with a fastener such as a buckle) can be used to secure the angler's forearm 30 within the cradle 28.

Referring to FIG. 2, the arm cradle 28 includes a base portion 50 and opposing sidewalls 52 that curve upwardly from the base portion 50 so as to define an upwardly facing channel. The arm cradle 28 includes a front end 54 positioned opposite from a back end 56, and a left side 58 positioned opposite from a right side 60. A length L of the arm cradle 28 is defined between the front and back ends 54, 56, and a width W of the arm cradle 28 is defined between the left and right sides 58, 60. As best shown in FIGS. 1 and 3, the arm cradle 28 preferably inclines upwardly from the fishing rod 22 as the arm cradle extends from the front end 54 to the back end 56.

It is preferred for the length L of the cradle 28 to be longer than the width W of the cradle. In one embodiment, the length L is at least 1.5 times longer than the width W. In another embodiment, the length L is equal to or greater than 2 times the width W. In a preferred embodiment, the length is in the range of 5 to 12 inches, and the width W is in the range of 4 to 6 inches. Of course, sizes outside the specified ranges are also included within the scope of the present invention.

It is preferred for the arm cradle 28 to be made of a relatively light material such as plastic. By selecting a desired weight, the arm support device 20 can be used to effectively balance the fishing rod 22. In certain embodiments, weighting devices 300 can be added to or removed from the arm cradle 22 to provide customized weight suitable for the angler. For example, the weight devices 300 can be adhesively affixed or otherwise secured to the underside of the cradle 28.

Referring to FIG. 3, the pivot pin 34 of the arm support device 20 is connected to the arm cradle 28 at a location adjacent to the front end 54 of the arm cradle 28. The pivot pin 34 includes a pivot shaft 70 that extends downwardly from the front end of the arm cradle 28 to the clamp 34. The pivot shaft 70 is preferably free to pivot relative to the clamp 32 about a pivot axis 72 (see FIG. 4). As shown in FIG. 2, the pivot axis 72 is offset to a right side 41 of the fishing rod 22 and a central longitudinal axis 302 of the arm cradle 28 intersects the pivot axis 72. As also shown at FIG. 2, the length L of the arm cradle 28 extends generally radially outwardly from the pivot axis 72. With the pivot axis 72 offset to the right side 41 of the fishing rod 22, the arm support device 20 is most preferably suited for right-handed anglers that grasp the reel 46 with their right hand as shown in FIG. 1. For left-handed anglers, the pivot axis 72 is preferably offset to a left side 43 of the fishing rod 22.

FIG. 2 shows the arm cradle 28 being laterally pivoted relative to the fishing rod 22. In certain embodiments, the pivot pin 34 is configured to freely pivot relative to the clamp 34 so that the cradle 28 can follow the angler's forearm as the angler bends his or her wrist. In other embodiments, the pin 34 can frictionally engage the clamp 32 with sufficient tension to allow the cradle 28 to be manually pivoted to a desired angle relative to the rod 22, and then to maintain the desired angle until the angler decides to re-adjust the angle. In certain embodiments, a locking structure such as a set screw or other means can be used to lock the cradle 28 at the angle preferred by the angler.

Referring to FIG. 4, the clamp 32 includes first and second pieces 100 and 102 having inner sides 100A and 102A that oppose one another. The inner sides 100A and 102A includes recesses 104 and 106 that cooperate to define a receptacle 108 for receiving the handle 24 of the fishing rod 22. The receptacle 108 has a central axis 304. To mount the handle 24 within the clamp 32, the pieces 100, 102 are positioned on the left and right sides 41, 43 of the fishing rod 22 and are pressed together such that the handle 24 is captured within the receptacle 108. The pieces 100, 102 are then clamped together by fasteners such as bolts 110 that draw the pieces 100, 102 together such that the handle 24 is firmly clamped within the receptacle 108.

As shown in FIGS. 2 and 4, the second piece 102 of the clamp 32 includes a structure 130 for receiving the pivot shaft 70 of the pivot pin 34. By selectively mounting the second piece 102 on either the left side or the right side of the fishing rod 22, the arm support device 20 can be configured to be used by either a right-handed or a left-handed fisherman.

Referring again to FIG. 4, the structure 130 for receiving the pivot shaft 70 includes a shank 140 having a head 142. The head 142 seats within a pocket 146 defined within the second piece 102 of the clamp 32. A main body 143 of the shank extends from the pocket 146 through a clearance opening 148 to a region located exterior of the second piece 102. The shank 140 also defines an opening 150 through which the pivot pin extends. The pivot pin 70 can preferably rotate within the opening 150 to allow the arm cradle 28 to be pivoted to the left and right relative to the fishing rod 22. Fasteners such as collars 152 having set screws 154 can be mounted on the pivot pin 70 above and below the shank 140 to prevent the shaft 70 from being unintentionally removed from the opening 150. In alternative embodiments, the fasteners can be eliminated such that the pivot shaft 70 can be readily inserted into or removed from the opening 150.

The structure 130 is also configured to allow the angle of incline of the arm cradle 28 to be adjusted relative to the fishing rod 22. For example, the shank 140 includes a threaded portion 155 on which a nut 157 is mounted. By tightening the nut 157 on the threaded portion 155, the shank 140 can be clamped relative to the second piece 102 such that the opening 150 is locked at a position corresponding to the desired angle θ of the arm cradle 28 relative to the rod 22. To adjust the angle θ, the nut 157 is loosened to allow the shank 140 to be turned or pivoted about its longitudinal axis to increase or decrease the angle θ relative to the rod 22. FIG. 3 shows the arm cradle 28 in phantom line positioned at several different incline angles relative to the rod. It will be appreciated that angle θ can also be adjusted by bending the pivot shaft 70 at location 158. In certain embodiments, the angle θ is in the range of 0-45 degrees. In other embodiments, the angle is in the range of 15-30 degrees.

In one embodiment, the head 142 of the shank 140 and the pocket 146 are circular in transverse cross-section. In other embodiments, the head 142 and the pocket can have mating shapes with flats, projections or other structures that allow the head 142 to be positioned at a plurality of discrete rotational positions within the pocket 144. Each discrete rotational position corresponds to a different angle of incline of the cradle 28.

FIGS. 4 and 5 illustrate an alternative arm support device 220 having features that are examples of inventive aspects in accordance with the principles of the present disclosure. The arm support device 220 includes an arm cradle 228 connected to a clamp 234. The clamp 234 is adapted to be secured to the handle 24 of the fishing rod 22.

Referring to FIG. 5, the arm cradle 228 includes a base portion 250 and two side walls 252. An arm cushioning member 291 is secured to the base 250. A pivot pin 232 is mounted to the front end of the arm cradle 228.

Referring to FIGS. 5 and 6, the clamp 234 includes first and second clamp pieces 200, 202. In certain embodiments, the clamp pieces 200, 202 are made of a plastic/polymeric material such as polycarbonate. The clamp pieces 200, 202 define opposing inner surfaces 200a, 202a which cooperate to define an interior channel or receptacle 208 for receiving the rod handle 24. The pieces 200, 202 include gripping projections 293 that project radially into the receptacle 208. The projections 293 are adapted to press into the handle 24 of the fishing rod 22 to resist relative rotational movement between the handle 24 and the clamp 234. Fasteners 210 such as screws or bolts or other fasteners are used to draw the clamping members 200, 202 together to clamp the handle 24 within the receptacle 208.

Referring to FIG. 6, the clamp 234 defines a generally upright pivot opening 250 that extends through the second clamping member 202 at a location laterally offset from the handle receptacle 208. The pivot opening 250 is adapted to pivotally receive a lower pivot shaft 270 of the pivot pin 232. Fasteners 252 can be used to prevent the pivot pin 232 from inadvertently being withdrawn from the pivot opening 250.

With regard to the foregoing description, changes may be made in detail, especially with regard to the shape, size and arrangement of the parts. It is intended that the specification and depicted aspects be considered elective only and not limiting with respect to the broad underlying concepts of the present disclosure.

I claim:
1. An arm support device for use with an elongated item having a handle, the arm support device comprising:
 a coupler adapted to be coupled to the handle;
 a forearm receiving member defining a channel elongated along a length that extends between open front and rear ends of the forearm receiving member, the channel having an open top side, the forearm receiving member being positioned above the coupler; and
 a pivot member that connects the forearm receiving member to the coupler, the pivot member defining a pivot axis that extends generally in an upward/downward direction and is located adjacent the front end of the forearm receiving member, the forearm receiving member being pivotally moveable about the pivot axis defined by the pivot member, and the length of the forearm receiving member extending generally radially outwardly from the pivot axis.

2. The arm support device of claim 1, wherein the forearm receiving member includes a base portion that inclines upwardly from the coupler.

3. The arm support device of claim 1, wherein the forearm receiving member inclines relative to the coupler as the forearm receiving member extends from the front end to the back end.

4. An arm support device for use with an elongated item having a handle, the arm support device comprising:
a handle coupler defining a pivot shaft opening;
an arm cradle having a base portion and opposing left and right side walls that define an upwardly facing channel having an open top side, the channel having a width and a length, the width of the channel being defined as a maximum distance measured between the left and right side walls, the length of the channel being generally perpendicular to the width and extending from a front end to a back end of the base portion, and the width of the channel being shorter than the length of the channel; and
a pivot pin positioned at the front end of the base portion of the arm cradle, the pivot pin including a pivot shaft portion defining a pivot axis about which the arm cradle pivots, the pivot shaft portion extending downwardly relative to the arm cradle such that the pivot axis extends generally in an upward/downward direction, the pivot shaft portion being pivotally received within the pivot shaft opening of the coupler, the length of the channel of the arm cradle extending generally radially outwardly from the pivot axis.

5. The arm support device of claim 4, wherein the base portion inclines as the base portion extends from the front end to the back end of the base portion.

6. The arm support device of claim 4, wherein the length of the channel is at least two times larger than the width of the channel.

7. The arm support device of claim 4, wherein the length of the channel is in the range of 5-12 inches.

8. The arm support device of claim 4, wherein the pivot pin includes an upper end portion positioned at a bottom of the base portion of the arm cradle and a lower end portion defining the pivot shaft portion of the pivot pin, and wherein the upper end portion of the pivot pin is aligned at an obtuse angle relative to the lower end portion of the pivot pin.

* * * * *